Nov. 9, 1926.
W. L. BODMAN
VALVE
Filed Nov. 21, 1925
1,606,500
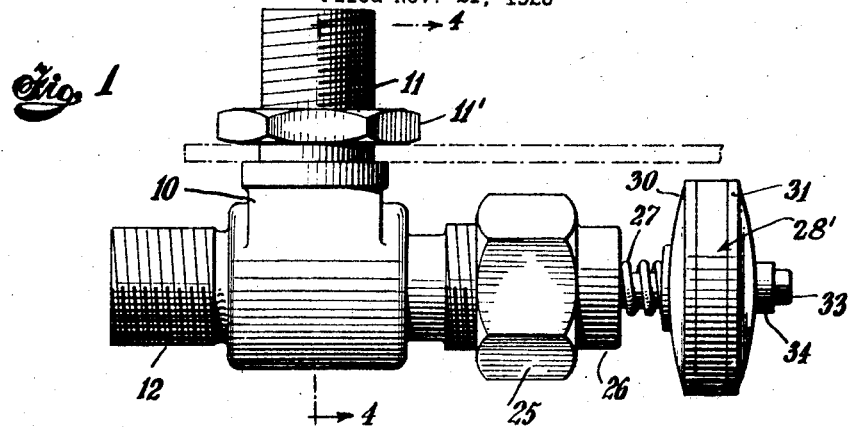
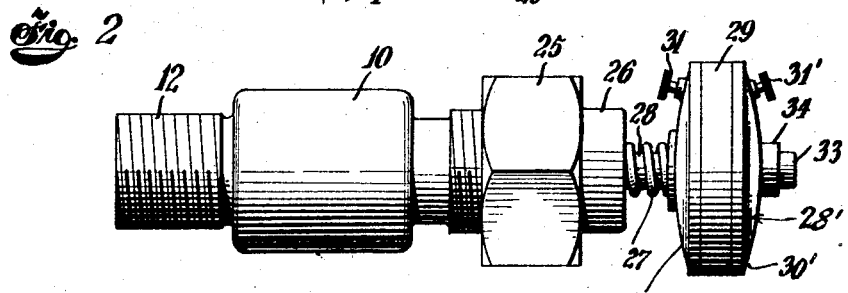
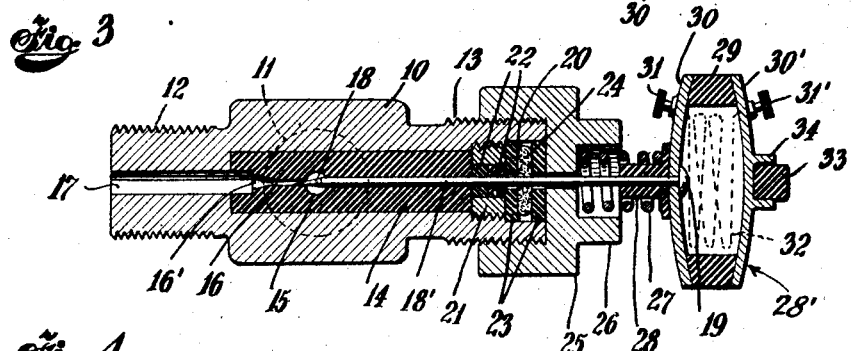
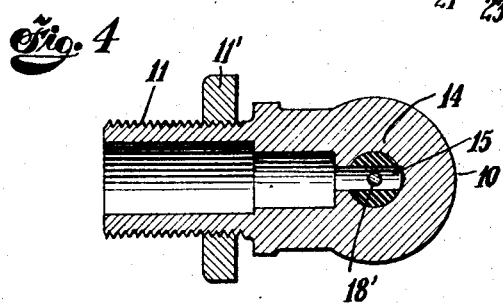
INVENTOR.
Walter Light Bodman,
BY
Ramsey Hoguet,
ATTORNEYS.

Patented Nov. 9, 1926.

1,606,500

UNITED STATES PATENT OFFICE.

WALTER LIGHT BODMAN, OF NEW YORK, N. Y., ASSIGNOR, BY MESNE ASSIGNMENTS, TO THE ROYALTIES CORPORATION, A CORPORATION OF NEW YORK.

VALVE.

Application filed November 21, 1925. Serial No. 70,508.

My invention relates to improvements in valves, and more particularly in what I term an expansion valve, as it has to deal particularly with gases which are very highly compressed and which are liberated at brief intervals at very high velocity and which therefore expand rapidly. Such gases must be nicely controlled, and they are usually liberated at very high pressures and for very brief intervals. The expansion is so rapid that the expanding gases quickly absorb the heat from the surrounding atmosphere, and the valve itself is quite likely to become frosted and to stick. Moreover the valve must be capable of very quick action to prevent the waste of gas. An example of the use referred to is for liberating high pressure carbon dioxide to an expansion chamber.

The object of my invention is to produce a quick acting positive needle valve which is adapted to function as above outlined, which has its whole body and shank insulated, and which is connected with a heating medium so that for the brief interval it is exposed to the expanding gases there will be no danger of its sticking or frosting. My invention is also intended to produce a valve which can be held closed by pressure against the end of the valve, and which will instantly open when the closing pressure is removed. The advantages of the structure will be better understood from the following description.

Reference is to be had to the accompanying drawings forming a part of this specification, in which similar reference characters indicate corresponding parts in all the views.

Figure 1 is a plan view of the valve embodying my invention.

Figure 2 is a side elevation of the valve.

Figure 3 is a longitudinal section thereof, and

Figure 4 is a cross-section on the line 4—4 of Figure 1.

The valve is provided with a suitable casing 10 having on one side a threaded inlet nipple 11 which is shown provided with a lock nut 11', and at one end and at right angles to the nipple 11 is a threaded nipple 12 adapted to couple to any desired object, as for example an expansion member. At the opposite end the casing is elongated as shown at 13, this part being preferably in alignment with the part 12 for convenience of construction, and the part 13 is exteriorly screw threaded. The above described features are common to many valves, and the conventional shape is preferred. This shape also lends itself to my improvements, which comprise the matters described below.

Extending longitudinally of the casing 10 and in the center thereof is a body of heat and electricity insulating material 14 which is held in the bore of the casing, and entering this from the inlet nipple 11 is a transverse bore 15 which connects with a very small discharge bore 16 enlarged at its outer end as shown at 16' in Figure 3, and finally discharging through the bore 17. The discharge bore 16 is closed by the needle valve 18, the point of which enters the bore, and this needle valve is as usual with needle valves, made on the end of an extended shank 18'. The shank 18' passes out through the gland at the end of the casing 10, and to this end the casing has an enlarged bore 20, the inner part of which is screw threaded to receive a nut 21, in which are insulating washers 22, and within the bore 20 and outside the nut 21 are spaced washers 23 between which is an elastic stuffing 24 of rubber or the like. The gland has a nut 25 which screws to the threaded part 13 of the casing 10, and the nut has preferably a circular flange 26 at its outer end to serve as a guide for the spring 27 which is seated within the flange and encircles an insulating boss 28 on a casing 28'; the latter comprising spaced sides 30 and 30' and a body portion 29 formed preferably of insulating material. As shown clearly in Fig. 3 the shank 18' extends through an opening in nut 25, through the boss 28 and is connected to the side 30 of casing 28' by heading or upsetting the end of said shank, as shown at 19.

The casing 28' is intended to contain the heating element, which can most conveniently be an electric heating element 32, which is not shown in detail as any suitable heating element can be used, as for example nichrome wire, and the casing is provided with terminals 31 and 31'. It also has preferably on the back side, an insulated abutment 33 contained in a guide flange 34, so that some object, as for example a lever, can press against the abutment 33 and so press the casing 29 and shank 18' of the valve 18 into position to hold the valve closed, and when the pressure is removed, the spring 27 will open the valve, while the heating element will prevent it from being stuck by freezing. Obviously the valve might work in the reverse direction, that is being spring closed and opened by external pressure, without affecting the invention, and the particular construction of the valve can be departed from in many ways without changing the character of the invention.

I claim:—

1. A valve of the character described comprising a casing having a suitable inlet and outlet, the latter being located in an electrically insulating body, and a needle valve slidable in the insulating body and seated in the valve outlet.

2. A needle valve having an electrically insulated shank, and means for heating the shank and valve.

3. An article of manufacture comprising in combination with a needle valve an electric heating element secured to the stem thereof outside of the valve casing, to heat said valve and valve stem.

4. A valve comprising a casing having an internal heat and electric insulating core with an inlet and outlet bore therein, a needle valve movable in the core and closing the aforesaid bore, and means for heating the valve.

5. A valve comprising a casing having an electrically insulated core with an inlet and outlet bore therein, a needle valve insulated in the core and arranged to close the bore, the shank of the valve extending outward through the casing, and a heating element connected with the shank.

6. A valve comprising a casing having an electrically insulating core with an inlet and outlet bore therein, a needle valve movable in the core and arranged to close the bore, the shank of the valve extending outward through the casing, means for moving the shank and valve endwise, and a heating element connected with the outer end of the shank.

7. A valve according to claim 6, further characterized by having the heating element contained in a casing which is attached to the outer end of the valve shank.

8. An article of manufacture comprising in combination with a valve having a stem, a casing connected to said stem and having a heating element therein to heat said stem.

9. An article of manufacture comprising in combination with a valve having a stem, a casing connected to said stem and movable with said stem and electric heating means in said casing to heat said stem and said valve.

In testimony whereof, I have signed my name to this specification this 20th day of November, 1925.

WALTER LIGHT BODMAN.